Oct. 31, 1967  A. P. SHULTZ ETAL  3,350,078
FABRICATION AND HEAT-TREATING DIE MEANS
Original Filed Oct. 7, 1960  5 Sheets-Sheet 1

INVENTORS
ALVY P. SHULTZ
MICHAEL S. O'NEILL
WILSON D. KERNS

Oct. 31, 1967  A. P. SHULTZ ETAL  3,350,078
FABRICATION AND HEAT-TREATING DIE MEANS
Original Filed Oct. 7, 1960  5 Sheets-Sheet 2

*INVENTORS*
ALVY P SHULTZ
MICHAEL S. O'NEILL
WILSON D KERNS

*INVENTORS*
ALVY P. SHULTZ
MICHAEL S. O'NEILL
WILSON D. KERNS

ATTORNEY

United States Patent Office 3,350,078
Patented Oct. 31, 1967

3,350,078
FABRICATION AND HEAT-TREATING DIE MEANS
Alvy P. Shultz, Hawthorne, and Michael S. O'Neill, Los Angeles, Calif., and Wilson D. Kerns, Atlanta, Ga., assignors to North American Aviation, Inc.
Continuation of application Ser. No. 354,496, Mar. 6, 1964, which is a division of application Ser. No. 61,204, Oct. 7, 1960. This application Sept. 14, 1966, Ser. No. 579,412
5 Claims. (Cl. 266—4)

ABSTRACT OF THE DISCLOSURE

Ceramic dies having grooves in their work faces are used to support steel panels during brazing operations, the grooves communicating by a multitude of holes through the dies with cooling fluid chambers on the obverse side of the dies to cool the workpiece rapidly and uniformly. Heating of the workpiece is done by flowing current through high-resistance metallic strips laid over the die work faces.

---

Figure 1:
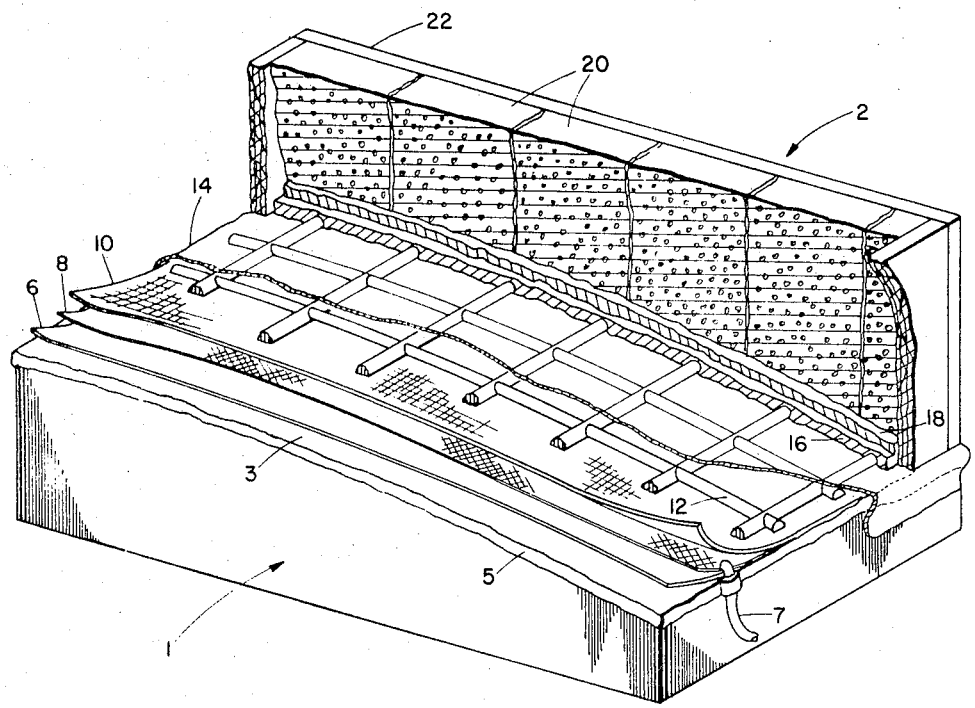

This case is a continuation of parent and copending application Ser. No. 354,496 filed Mar. 6, 1964, now abandoned, which was a divisional application from previously filed application Ser. No. 61,204 filed Oct. 7, 1960, now U.S. Patent 3,179,725.

This invention pertains to an apparatus for heating or cooling articles of manufacture such as may be required for brazing, bonding or heat-treating articles while structrual support is simultaneously applied thereto. More particularly, this invention relates to metallic articles of thin-walled configuration and relatively large size, involving rapid, uniform and closely controlled heating and cooling thereof to avoid the distortion or weakening of material in such articles which would otherwise occur.

Although this invention is of wide applicability in fabricating or heat-treating articles of diverse shapes and materials, it will be described for purposes of illustration in connection with the manufacture of stainless steel sandwich type panels having cellular core material between two face sheets. It will be understood that the scope of the inventive concept is in no sense limited by any of the specific details or illustrative examples used to explain the invention, except as determined by the accompanying claims.

Panels of the type referred to above are useful in various structures including advanced high speed aerial and space vehicles, wherein great structural strength is required at elevated operating temperatures and great precision is necessary in order to assemble component parts.

Of the various methods known to the prior art for joining cellular core material to surface sheets in a manner producing maximum strength, none has been found to produce the extremely close dimensional accuracy required in finished panels of tremendous size such as those involved in the problem situation described above. Moreover, none of the known methods is practical for the stated purpose in view of their extremely expensive and time-consuming aspects. Conventional methods for fabricating a work specimen of panel type would involve separate steps such as clamping the panel components in a temperature resistant fixture, heating the panel and fixture in a brazing oven, then cooling the panel and fixture after brazing is complete, including exposing the specimen to sub-zero temperatures either by air refrigeration or by direct contact with sub-cooled liquids. The handling procedures in the stated type of problem are poorly adapted for use with certain panel materials, such as precipitation-hardenable stainless steels used in the manufacture of high speed aircraft and space vehicles. The conventional fabrication techniques referred to above are incapable of providing the superior physical properties of the finished panel which necessitates rapid cooling of the specimen from brazing temperatures in excess of 1600° F. down to 1000° F. uniformly throughout the panel material in a period of 25 minutes or less, followed by subcooling at a controlled rate to transform the material to martensite. Any cooling rate less than that stated whether in localized or general areas of the panel specimen has a detrimental effect on the final physical properties of the panel structure. These effects result from both the panel structural arrangement and the panel material. Since the panel skin surfaces are fabricated from extremely thin gage sheet metal, and internal bracing members such as honeycomb core material are similarly thin due to severe limitations upon the weight of such components, the problem of brazing the stated elements together is complicated by the thermal characteristics of the structure. In brazing, the temperature of the entire panel surfaces and core material is raised much higher than the maximum temperature used for heat treatment of aging of the completed panel assembly, with the result that thermal changes such as expansion and contraction necessarily occur, as well as changes in physical characteristics such as strength and ductility. Moreover, metallurgical effects such as crystallization and heat treatment occur due to the application of brazing heat.

These several effects are particularly emphasized in the case of thin-walled components such as described above. Acute residual stress results from the non-uniform or uneven cooling of metal and from phase transformation of the granular structure therein throughout the panel specimen. The stress and distortion effects described above are virtually unavoidable and usually acute in brazing honeycomb type panels such as described above unless complete structural support is provided and uniform heating and cooling at controlled rates is accomplished. Therefore, many different laborious and complex fabrication techniques have been employed by industry in an attempt to achieve strong, reliable, and dimensionally accurate brazed panels by equipment of a size and cost reasonably adaptable to commercial use, but to date no known apparatus has proven successful in combining each of the stated desired results.

Accordingly, it is a principal object of the invention disclosed herein to provide a single fixture which functions as a brazing heat source, forming die, and heat-treatment fixture.

It is a further object of the invention disclosed herein to provide improved molds or dies for accomplishing the object set forth above incorporating means for heating and cooling the metal in such article at relatively rapid and closely controlled rates.

It is another object of this invention to provide improved molds or dies having low coefficient of expansion and high strength and hardness, together with increased resistance to extremes of heat and cold and to thermal shock.

It is a further object of this invention to provide molds or dies having improved compactness and lightness of weight.

It is another object of this invention to provide improved molds or dies having great versatility and accuracy in providing finished parts in a wide variety of different shapes or contours having precise dimensions.

It is a further object of this invention to provide molds or dies having improved usefulness in providing a fixture for use in brazing as well as heat treating the article contained within such molds or dies, without necessitating removal of the article during or between the stated operations.

It is an additional object in this case to provide an improved apparatus permitting continuous use of a single fixture for supporting metallic assemblies during application of heat to secure together the component parts thereof and for supporting the stated assemblies during subsequent heat treatment thereof including sub-cooling to effect improvement in the physical properties of such assemblies.

Figure 2:
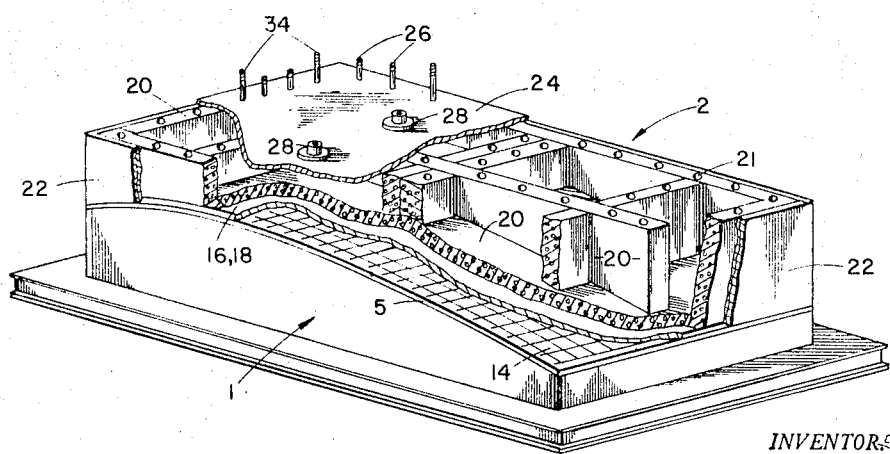
Figure 3:
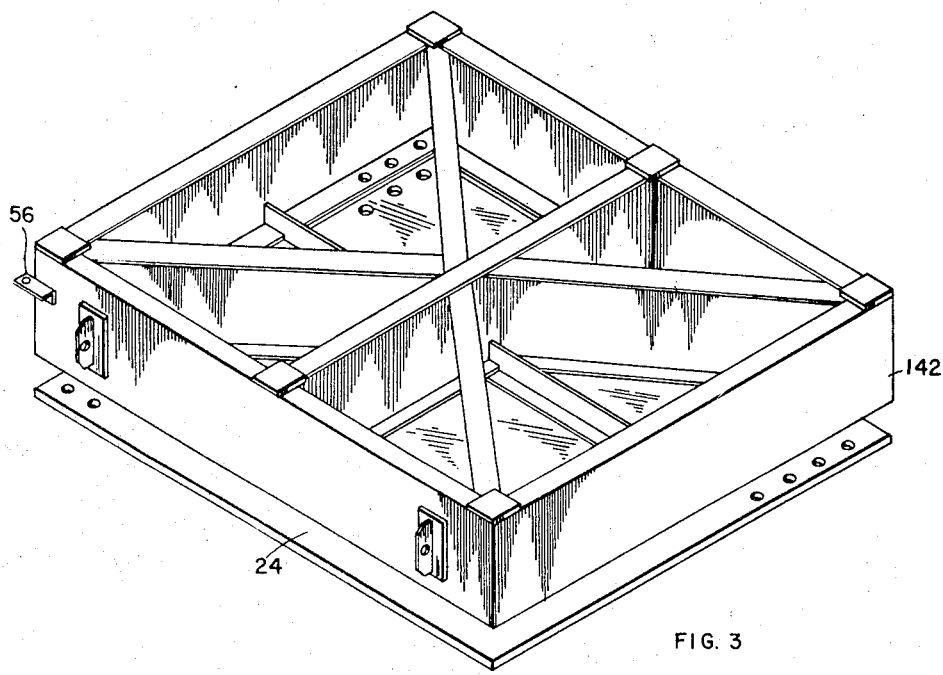
Figure 4:
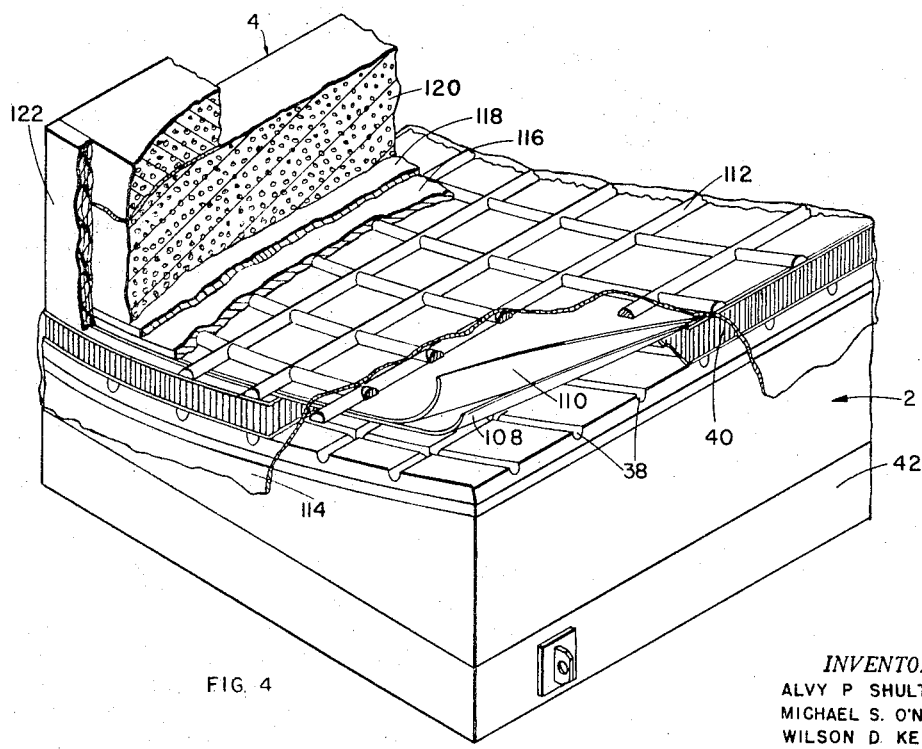
Figure 5:
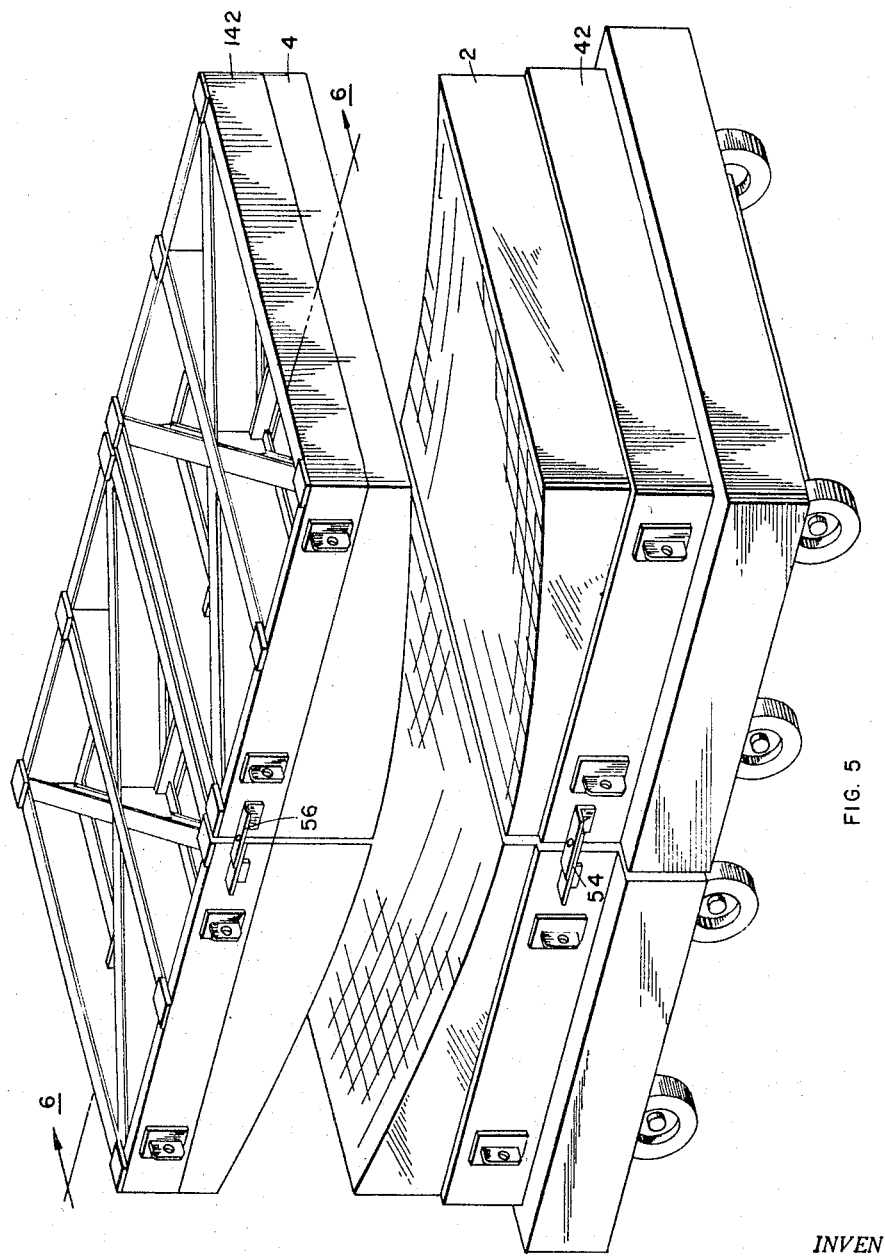
Figure 6:
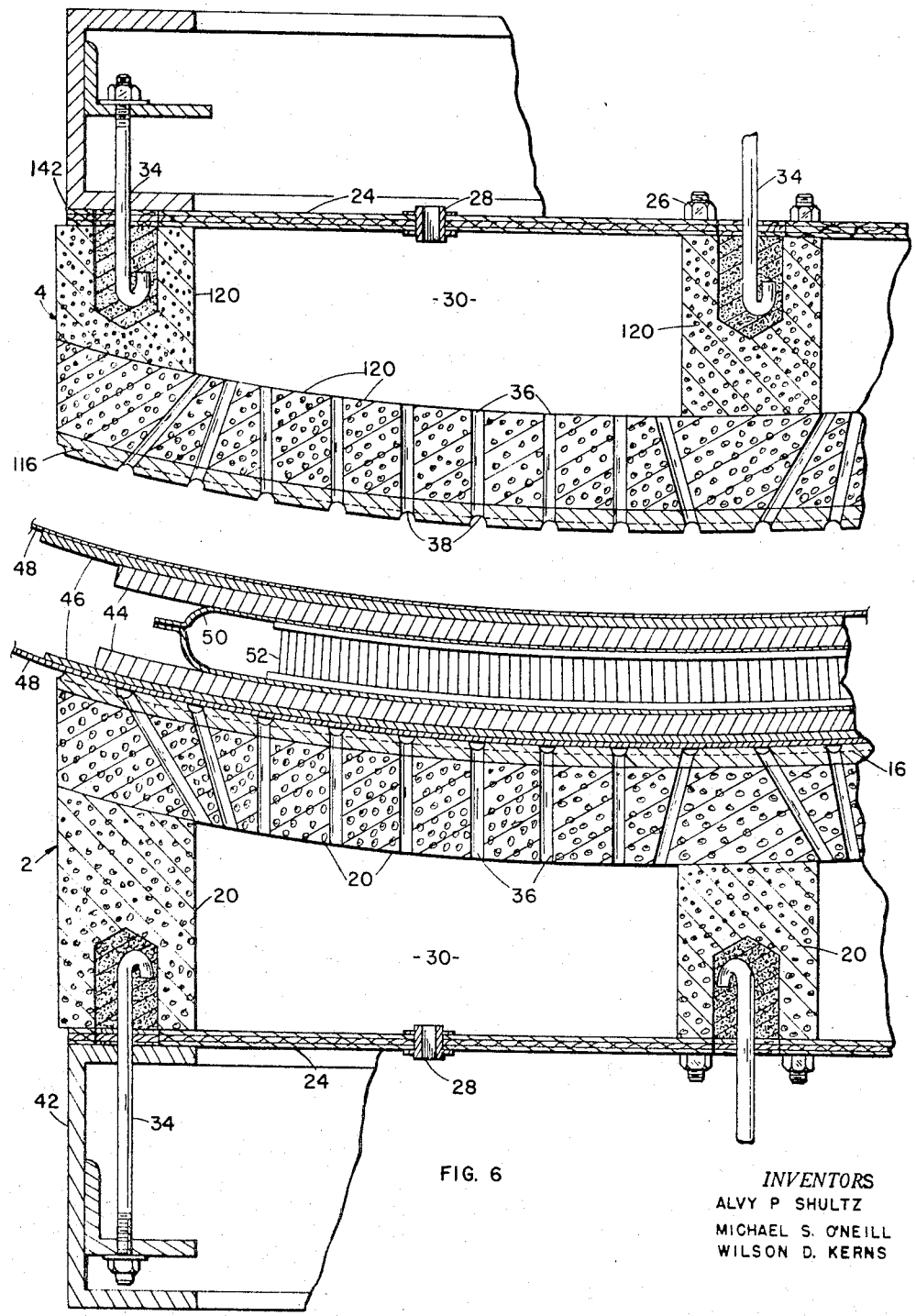
Figure 7:
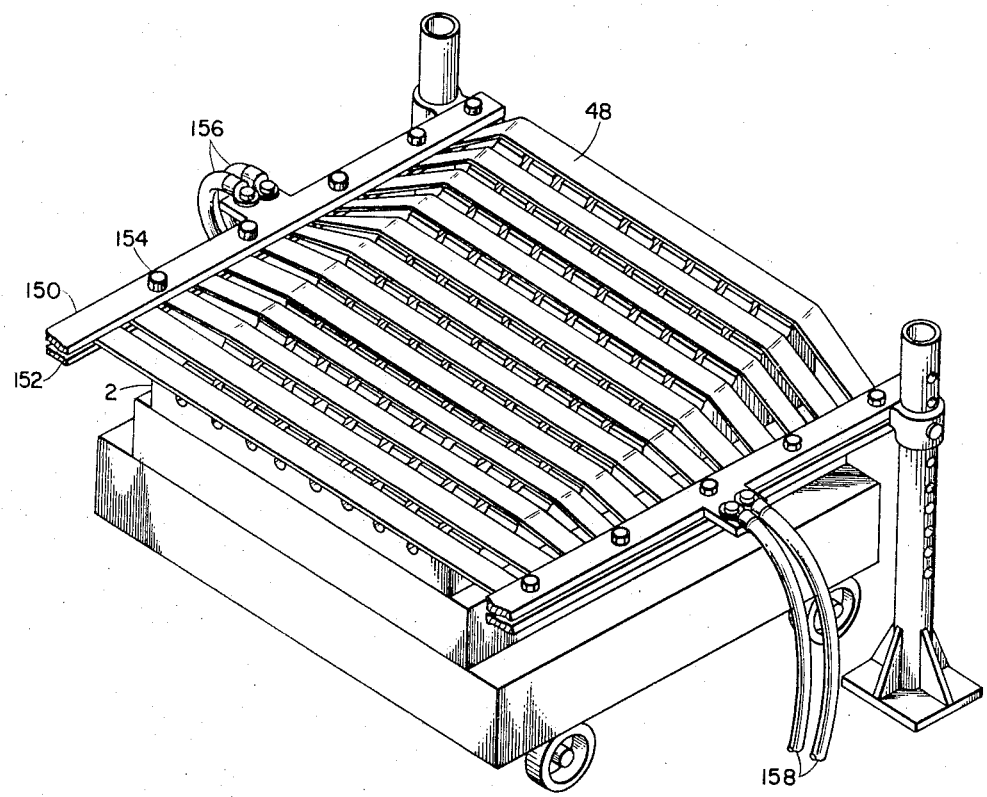

Other objects and advantages will become apparent upon a close reading of the following detailed description of an illustrative embodiment of the inventive concept, reference being had to the accompanying drawing wherein:

FIGURE 1 shows a perspective view partly broken away of a die being assembled in contact with a master model in accordance with the teachings of this invention, FIGURE 2 shows a perspective view partly broken away of the die shown by FIGURE 1 at a later state of its fabrication, FIGURE 3 shows a general perspective view of a steel supporting frame for attachment to the die shown by FIGURE 2, FIGURE 4 shows a perspective view partly broken away of another die being built up on the die shown by FIGURES 1 and 2, FIGURE 5 shows a general perspective view of two dies fabricated as shown by FIGURES 1 through 4 ready for use in fabricating an article of manufacture, FIGURE 6 shows a cross-sectional view taken through the dies shown by FIGURE 5 and in addition through the article of manufacture and related equipment used in the fabrication thereof, and FIGURE 7 shows a fragmented perspective view of the heating means for applying brazing heat in the novel apparatus of FIGURE 6.

In essence, the inventive apparatus disclosed herein comprises a single fixture consisting of two dies which will subsequently be identified as a lower and an upper die, designated by reference numerals 2 and 4, respectively.

With reference to the drawings and particularly to FIGURE 1, it may be seen that fabrication of the apparatus begins with build-up of a first die using a master model 1 which may be fabricated from wood or other suitable material and the surface of which may exactly simulate the contour of the finished article to be produced by the die. The first step in building the stated die may consist of covering the work surface of master model 1 with a coating 3 to smooth the stated surface and to seal pits or cracks therein. Various possible materials known to the prior art may be used for coating 3 such as polyvinyl chloride, which may be applied by brushing or spraying. After drying, coating 3 may then be covered by a tooling blanket 6 which functions to produce the desired shape or curvature of the work face of the die to be built up upon master model 1. As subsequently explained, the article to be formed by the finished dies may be placed within a metallic air-tight envelope with contacting sheets of heat-conducting material on either side thereof and supported thusly between the die work faces. The article formed by the dies using the stated procedure will have external surfaces which differ from the precise contour of the die work faces by an amount depending upon the thickness of the various materials or envelope walls lying intermediate of the article and the faces. The purpose of layer 6 is to provide a reference surface which will alter the work face of the die slightly to compensate for the stated intermediate elements. Thus, the use of blanket 6 will cause the relevant surface of the finished article to duplicate exactly the surface of master model 1 in spite of the stated elements. It will be understood that the inventive concept in this case is not limited to the use of a layer or blanket 6, and that this item may be omitted if not needed, such as when the article to be formed by the dies is not contained within an envelope of the type referred to above, or is otherwise not separated from the die work faces.

When advantageous or necessary, tooling blanket 6 may be included in the build-up procedure, and may be composed of various inert and lightweight plastic or other materials, such as "Styrofoam" polystyrene material, for example. Where layer 6 is formed of porous material or by a plurality of small separate sections arranged on master model 1 with their adjacent edges in close contact, it is also advantageous to provide a layer 8 of relatively stiff, thin and non-porous plastic material in the form of a single large sheet to make a continuous surface without seams such as will aid in applying a vacuum between the layers of material in a manner to be subsequently set forth. In contact with layer 8, a sheet of flexible and relatively porous material such as fiber glass fabric 10 is overlaid. A grid 12 is then laid over sheet 10, and a thin rubber or vinyl sheet 14 is placed over grid 12. While grid 12 may advantageously take various different forms or be made of many different materials, a relatively flexible plastic such as epoxy is generally well adapted to the purpose, and a rectangular pattern of the type shown in FIGURE 1, for example, produces very satisfactory results.

After the fabrication steps described above have been completed, a vacuum may be applied between sheet 14 and master model 1 by appropriate means to cause closer conformity between sheets 14 and grid 12. For example, a plurality of vacuum lines may be inserted between sheets 8 and 10 around the periphery of master model 1 in the manner of vacuum line 7 shown in FIGURE 1, and sheet 14 may be pulled down at the sides, covering the vacuum line terminal ends. Means for sealing the periphery of sheet 14 to the sides of master model 1 are included in the form of appropriate sealing compound 5 which may consist of zinc chromate. Sealer 5 is applied in a thin strip or bead around master model 1, and securely holds sheet 14 in contact therewith. While the stated vacuum is continuously applied, a layer 16 of paste-like material in the form of moist ceramic cement is troweled or otherwise applied over the entire top surface of sheet 14. Layer 16 may consist of any appropriate ceramic in paste form which, when completely dried or otherwise cured, will produce a strong hard, stable and chemically inert surface with suitable resistance to rapid and extreme changes of temperature. In the preferred embodiment of the inventive concept disclosed herein, the ceramic known as Glasrock, available from Glasrock Products, Inc., 1101 Glidden St., NW., Atlanta 18, Ga., is considered most suitable in achieving the objects set forth above. Glasrock is an amorphous silica refractory material.

Layer 16 may be allowed to dry completely and is later covered by another layer 18 of moist ceramic cement such as the same material as layer 16. Layer 18 is applied over layer 16 to a shallow depth such as one-half inch in order to provide an adhesive agent for bonding the remaining structure of the die to layer 16 which ultimately will form the working surface of the finished die. Alternatively, layer 16 may serve as a bonding agent if the remaining die structure is secured thereto while layer 16 is still moist. While layer 16 or layer 18 remains moist, depending upon which of the stated alternatives is used, a plurality of light structural members such as porous blocks or bricks 20 of foamed ceramic material are applied over the entire surface of master model 1 in bonded contact with layer 16. Bricks 20 may take the form of expanded Glasrock foam made of the same ceramic material but in slightly different form than that mentioned above in connection with layer 16 and available from the same source. Plywood dikes 22 may be used around the periphery of the master model to facilitate alignment and containment of bricks 20 during build-up of the die on the master model.

As shown by FIGURE 2, for example, a layer of bricks 20 is completely formed over the surface of layer 16 in bonded contact therewith, after which additional bricks may be arranged and cemented to the stated layer of bricks 20 to form partitions 32 which are later covered by plywood to form a plurality of compartments separated by the stated partitions. The exposed upper surfaces of bricks 20 are provided with appropriate means for the attachment of suitable supporting and lifting structure to the finished die, and in the illustrated structure take the form of a plurality of holes 21 in each of which a stud 26 may be cemented or otherwise secured in upwardly projecting relationship. When the die is thus far completed, a sheet metal or plywood covering 24 may be secured to bricks 20 by means of studs 21 to form a plurality of chambers 30 separated by partition 32. Covering 24 is provided with a plurality of gas inlet fittings 28 arranged to communicate with each of the chambers 30. Heavier studs 34 are also mounted in bricks 20 in the same general manner as studs 21 and provide structural connection by means of which a lightweight steel supporting frame 42 such as shown, for example, in FIGURE 3 may be affixed to the ceramic portion of the die. When the ceramic materials and bonding agents in the die are dry or otherwise completely cured, and frame 42 is securely affixed thereto, the completed die may be lifted off master model 1 by means of the stated frame and inverted to the position shown, for example, by FIGURE 4. Sheet 14 and grid 12 together with related contacting layers described above and used in the build-up of the die on master model 1 may then be peeled or otherwise removed from the surface of the die. It may then be seen that a plurality of grooves 38 corresponding in shape and depth with the intersecting elements of grid 12 are formed in the surface of the die. The number and pattern of grooves 38 may be varied according to the desired distribution of cooling effects from flow occurring in the grooves, while the width and depth of the grooves will depend upon the volume of air or other cooling agent required to cool the mass in a particular specimen within any given period of time. A plurality of holes 36 shown by FIGURE 6, for example, are drilled through the brick layer formed by bricks 20, the stated holes being located at the intersections of the grooves 38 formed in layer 16 by grid 12. Holes 36 are arranged as shown in FIGURE 6 to establish communication between chambers 30 and the working surface of the die to perform a function subsequently to be described. The completed die, designated generally by reference numeral 2 in FIGURE 4 is hereinafter referred to as the lower die to facilitate the remaining explanation of the inventive concept disclosed herein.

With lower die 2 positioned as shown in FIGURE 4, an upper die is formed thereon in a manner generally the same as that used to fabricate lower die 2 on the master model 1. Thus, lower die 2 performs a function in the fabrication of the upper die similar to the function performed by a master model. However, when the completed dies are intended for use with panel type structure such as described above having substantial thickness, means are included in the build-up of the upper die to insure that the working surface of the upper die will provide a finished panel structure having the desired shape or curvature on its upper surface, which may not necessarily coincide with the shape or contour of the working surface of lower die 2. As shown in FIGURE 4 for the sake of illustration, a thickness blank 40 of approximately the same thickness as that desired for the finished honeycomb panel may be placed in contacting relationship upon lower die 2 as shown. Build-up of the upper die may then be undertaken using the upper surface of blank 40 as the reference surface for determining the contour of the working face of the upper die.

Since the upper surface of blank 40 may consist of metal or plastic having sufficient smoothness and other physical properties requisite for the purpose, layers 3 and/or 6 may be omitted as a matter of choice. Accordingly, layer 108 corresponding in function and composition to layer 8 previously described in connection with build-up of lower die 2 may be laid directly upon blank 40. Thereafter, fiber glass sheet 110 together with grid 112 and sheet 114 corresponding respectively to items 10, 12 and 14 previously described are placed in the stated order over layer 8, and ceramic cement layers 116 and 118 are applied in the sequence and manner described above in connection with layers 16 and 18 forming lower die 2. Bricks 120 are thereby bonded to layer 116 in the manner described above to form a plurality of plenum chambers 30 with a covering member thereover and a steel frame secured thereto all in the manner and for the purpose discussed hereinabove for the fabrication of lower die 2.

The completed lower and upper dies 2 and 4, respectively, together with their supporting steel frames 42 and 142, ready for use in fabricating an article of panel type such as described above is shown by FIGURE 5. It may be seen from the stated figure that each of the upper and lower dies is formed in a plurality of separate sections rather than by a large single section. Suitable provision is made in the form of overlapping brackets 54 and 56 for connecting the two lower and upper die sections together, respectively. It is obvious that many different variations in shape and size of cooperating dies in addition to those shown by FIGURE 5 may be fabricated by the methods disclosed herein, and any number of separate sections may be thus fabricated individually and later secured together for molding tremendous articles of panel or other type. This feature permits great facility in handling and great flexibility of design in fabricating dies for the manufacture of any articles requiring the application of heat to secure together the component parts thereof or improve the metallic properties of the material therein.

FIGURE 6 shows a cross-sectional view of the dies shown by FIGURE 5 about to be used in the fabrication of a precipitation-hardenable stainless steel panel of honeycomb sandwich type such as described hereinabove. While the panel specimen designated by reference numeral 52 in FIGURE 6 is initially mounted within an air-tight container or retort 50 which may be formed of steel to provide a closed envelope completely containing the specimen therein, the dies disclosed herein may be used for heat-treatment of specimens without such envelope if no such enclosure is useful or necessary. The contacting surfaces between the honeycomb core of panel 52 and the sheet metal surfaces thereof are treated with appropriate brazing agents or bonding compounds and arranged in the desired relationship within retort 50, and an inert gas such as argon may be used to fill retort 50 prior to the application of heat thereto. Suitable heat conducting and distributing means such as copper sheet or strips 44 may be placed in contact with the upper and lower surfaces of retort 50 as shown by FIGURE 6 to aid in the even distribution of heating and cooling effects throughout the surfaces of the retort, although strips 44 may be omitted if their function is adequately performed by making the retort walls of sufficient thickness and of material having good heat conducting properties. Appropriate heating elements 48 may be used to provide brazing heat by the conversion of electrical energy and are separated from copper elements 44 by an insulating blanket 46 of suitable dielectric material. Heating elements 48 may comprise a plurality of strips of Inconel of a width approximately the same as the width of the raised ceramic rectangular surfaces on dies 2 and 4 formed by proove 38. Thus, a plurality of strips 48 may be placed in parallel relationship on the faces of dies 2 and 4 and separated by a distance equivalent to the width of grooves 38, the stated strips being connected by appropriate means to a power source (not shown) by means of which heating current may be applied to the stated elements. In FIGURE 6, upper die 4 is shown in a slightly raised position for the sake of clarity, and during actual operation is lowered by an amount sufficient to apply moderate pressure upon retort 50 during heating thereof by strips 48. The amount of heat applied by strips 48 may be varied according to the power supplied thereto and the precise material used in their fabrication. Since the ceramic material used in dies 2 and 4 specified in connection with the preferred embodiment of this invention has excellent heat insulation qualities, the majority of the heat originating within strips 48 is directed through copper elements 44 and retort 50 to specimen 52. After the desired amount of heating has been accomplished, the supply of heating current may be terminated, and controlled uniform cooling of specimen 52 may be accomplished by cooling means incorporated into dies 2 and 4 during their fabrication.

The stated cooling means includes a plurality of plenum chambers 30 into which air or gas may be flowed by means of appropriate connections such as inlets 28. Cooling of specimen 52 is accomplished by the introduction of a suitable relatively low temperature fluid medium from plenum chambers 30 through a plurality of holes 36 leading from the plenum chambers to the work faces of dies 2 and 4. Upon reaching the work faces, the stated medium will contact the surfaces of the article which is supported by the work faces at as many places as there are holes 36. Additional and more rapid cooling of the article occurs by reason of the flow of such cooling medium through grooves 38 which conduct the cooling medium over the entire surface of the elements contacting the die faces and in close proximity thereto, resulting in rapid, efficient, and uniform cooling of such elements including retort 50 and specimen 52. Exit flow of the cooling medium occurs around the entire periphery of dies 2 and 4 by means of grooves 38 which communicate with the surrounding atmosphere external of the dies.

The amount and rate of cooling thus accomplished may be varied or otherwise controlled by selection of a particular cooling medium or rate of flow of such medium through the dies in the manner described. For example, use of air as a cooling fluid will result in a more gradual cooling rate than that resulting from use of a sub-cooling fluid such as low temperature nitrogen gas. Since the ceramic and Glasrock material specified in the preferred embodiment of the inventive concept is extremely resistant to thermal shock and stable at both high and low extremes of temperature, a rapid flow of sub-cooling fluid through the dies may safely be accomplished immediately after the application of high temperature brazing heat without danger to personnel or damage to the apparatus. Rapid and continuous flow of the cooling medium through holes 36 and grooves 38 may be maintained for the necessary period of time to result in cooling of specimen 52 at the desired rate. Moreover, this flow may continue for such additional time as required to accomplish heat treatment of specimen 52. For example, martensitic change of precipitation-hardenable stainless steel material used in specimen 52 such as associated with sub-cooling of such material may be performed by the cooling means incorporated in dies 2 and 4. During heat treatment of specimen 52 such as in the case of sub-cooling described above, dies 2 and 4 may apply restraining force on the specimen as an aid in preventing distortion of the specimen due to martensitic transformation. At the conclusion of the processes set forth above, dies 2 and 4 may be separated and specimen 52 may be removed from retort 50 in its finished form without need for further heat treatment, fabrication processes or use of additional fixtures.

Since the Glasrock material used in forming dies 2 and 4 as disclosed herein is an excellent heat insulator, and the heating effects of strips 48 on bricks 20 are minimal as stated above, only a small portion of the initial cooling gas flow through plenum chambers 30 and holes 36 is involved in cooling the dies, with the result that cooling of specimen 52 in the stated manner is rapid, immediate, and complete.

Moreover, it may be seen that cooling gas may be applied directly to the specimen, or to the walls of retort 50 when a retort is used, by means of holes 36 and not merely to the external surfaces of the dies, hence it is not necessary to cool the dies in order to cool the specimen. Conventional cooling methods and devices involving oven or furnace heating of metallic specimens often require the application of the cooling medium on the external surfaces of the die or fixture after such heating, and would involve hours to achieve an amount of cooling equivalent to that accomplished in a matter of minutes by the novel method disclosed herein.

From the disclosure set forth herein and illustrated in the drawings it may be seen that this invention provides an improved method and apparatus for the continuous and uninterrupted fabrication and heat treatment of complex articles of thin-walled construction having greater dimensional accuracy and superior physical properties compared to articles of similar nature produced by devices and techniques known to the prior art. The fabrication of dies 2 and 4 as disclosed hereinabove constitutes an extremely inexpensive and versatile method for producing dies for a wide variety of different articles compared to fixtures of similar nature known to the prior art. In addition, the accuracy of dies made in accordance with the method disclosed herein is superior to that achieved by conventional fabrication methods because the lower die in the instant case is formed directly from the master model, and produces as accurate a mold line surface as that of the master model itself, besides which the master facility tool normally required to form a die from a master model is eliminated in the inventive die fabrication method disclosed herein. It is additionally important to the invention disclosed herein that the degree of accuracy thus achieved in respect to the lower die is maintained in the fabrication of the upper die by reason of the fact that the upper die face is cast or molded against the lower die face as a reference surface in the manner of a master model. It is also an advantage of the die fabrication method disclosed herein that either or both of the upper or lower dies may be formed in a plurality of separate sections and used conjointly for molding tremendous articles. Moreover, repair of such dies in their entirely or any portion thereof is a relatively simple matter by use of the materials and methods for die fabrication disclosed herein, since the ceramic cement which initially forms the die face will easily adhere to itself when applied to the die surfaces after fabrication of the face is complete.

It may further be seen from the disclosure set forth herein that the die work faces are adapted to apply substantially continuous and uniform area pressure to the areas of the specimen or envelope which the dies support, whereby no local or concentrated loads are applied to delicate workpieces of pressure-sensitive thin-walled construction such as would puncture or deform the same. Thus, the total area affected by grooves 38, for example, is on the order of five percent or less of the total area of the work face in which the grooves are situated.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. Die means for supporting a specimen of thin-walled, thermal and pressure-sensitive construction during the transfer of heat to or from said specimen, including at least one work face adapted to apply substantially continuous area pressure to a surface of said specimen, heating means removably supported on said work face for applying heat directly and uniformly to said specimen, and cooling means comprising a plurality of grooves on said work face for flowing a cooling medium directly and uniformly over a substantial portion of said surface.

2. The structure set forth in claim 1 above, wherein said die means comprises an amorphous silica refractory material.

3. Die means for supporting an article during the transfer of heat either into or out of said article, including at least one work face adapted to make substantially continuous supporting contact with a surface of said article, groove means in said work face comprising a plurality of spaced-apart grooves for conducting a cooling medium of substantially uniform temperature across said work face in close proximity to said surface, and a plurality of metallic conductors removably supported on said work face for applying heat directly and uniformly to said article, said work face comprising ceramic material.

4. Apparatus for brazing together a plurality of workpiece components to form a panel of lightweight thin-walled construction, said apparatus comprising: a die work face of Glasrock ceramic material adapted to support said workpiece components, heating means comprising a plurality of thin metallic electrically conductive strips supported on said work face for applying heat to said workpiece components, and cooling means on said work face comprising a plurality of grooves therein for flowing a cooling medium across said workface over a substantial portion thereof.

5. Apparatus for brazing together the component parts of a lightweight steel panel having a honeycomb core and a face sheet secured to either side thereof, said apparatus comprising: a ceramic die having a work face adapted to support the said components in their desired final relationship, said work face having a plurality of spaced-apart grooves therein, said die including chamber means forming part of said die and located on the converse side of said work face for containing a cooling medium, said die further including passage means through said die connecting said chamber means to said grooves by a plurality of separate passages, and heating means comprising a plurality of thin metallic electrically conductive strips supported on said work face for applying heat to said workpiece components.

References Cited
UNITED STATES PATENTS

| | | | |
|---|---|---|---|
| 2,927,620 | 3/1960 | Elliott | 100—93 |
| 3,047,710 | 7/1962 | Rowe | 29—455 |
| 3,106,015 | 10/1963 | Herbert | 29—471.1 |
| 3,112,388 | 11/1963 | Wiant | 219—85 |
| 3,112,389 | 11/1963 | Wiant | 219—85 |
| 3,173,813 | 3/1965 | Dewey et al. | 266—6 X |
| 3,189,337 | 6/1965 | North | 266—5 X |

J. SPENCER OVERHOLSER, *Primary Examiner.*

R. S. ANNEAR, *Assistant Examiner.*